(12) United States Patent
Howlett

(10) Patent No.: US 8,661,877 B2
(45) Date of Patent: Mar. 4, 2014

(54) APPARATUS AND METHOD FOR TESTING FLOAT EQUIPMENT

(75) Inventor: Paul Howlett, Aberdeen (GB)

(73) Assignee: Sudelac Limited (GB)

( * ) Notice: Subject to any disclaimer, the term of this patent is extended or adjusted under 35 U.S.C. 154(b) by 173 days.

(21) Appl. No.: 13/468,960

(22) Filed: May 10, 2012

(65) Prior Publication Data

US 2012/0285222 A1 Nov. 15, 2012

(30) Foreign Application Priority Data

May 10, 2011 (GB) .................................. 1107747.6
Dec. 23, 2011 (GB) .................................. 1122330.2

(51) Int. Cl.
*G01M 3/04* (2006.01)
(52) U.S. Cl.
USPC .......................................................... 73/49.8
(58) Field of Classification Search
USPC ................................................ 73/46, 152.57
See application file for complete search history.

(56) References Cited

U.S. PATENT DOCUMENTS

| | | |
|---|---|---|
| 1,937,188 A | 11/1933 | Bloss |
| 2,008,818 A | 7/1935 | Corbett |
| 2,117,318 A | 5/1938 | Hanes |
| 5,181,571 A | 1/1993 | Mueller |
| 5,472,053 A | 12/1995 | Sullaway |

FOREIGN PATENT DOCUMENTS

WO 2011090941 A1 7/2011

OTHER PUBLICATIONS

Halliburton Energy Services Technical Review, Technical Review of Super Seal II® Floating with Integral Post Production Pressure Test Capability, 2009, Halliburton (2 pages).

*Primary Examiner* — John Fitzgerald
(74) *Attorney, Agent, or Firm* — Workman Nydegger

(57) ABSTRACT

Apparatus and method for testing float equipment used in the construction of wellbores for the hydrocarbon exploration and production industry. The apparatus has a housing and an opening for receiving an item of float equipment. A seal arrangement is configured to seal with the item of float equipment, such that the housing and seal arrangement together define a test chamber. The test chamber is pressurized to expose at least a part of the item of float equipment in the test chamber to a test pressure. In embodiments of the invention, at least a part of an outside surface and at least a part of the item of float equipment may be simultaneously loaded. The tests performed more closely simulate the conditions to which the equipment is exposed in a wellbore.

27 Claims, 4 Drawing Sheets

APPARATUS AND METHOD FOR TESTING FLOAT EQUIPMENT

CROSS-REFERENCE TO RELATED APPLICATIONS

This application claims the benefit of United Kingdom Patent Application No. 1107747.6, filed on May 10, 2011, and United Kingdom Patent Application No. 1122330.2, filed on Dec. 23, 2011, which are incorporated herein by reference

BACKGROUND OF THE INVENTION

1. The Field of the Invention

The present invention relates to an apparatus and method of testing float equipment used in the construction of wells for the hydrocarbon exploration and production industry, and in particular to an apparatus and method for testing the pressure integrity of float equipment, including but not limited to float shoes and float collars used in cementing operations.

2. The Relevant Technology

In the construction of oil and gas wells, drillable non-return back-pressure valves are used to prevent liquid cement flowing back inside wellbore casing and to prevent fluids from flowing into a range of tubulars during run-in. The valves are usually one way valves located towards the end of the tubular or casing string so fluid can be pumped out of the pipe but cannot flow back inside. The drillable non-return back-pressure valves are placed inside short purpose built sections of pipe that match the characteristics of the rest of the tubing string, and are usually closed with the assistance of a spring. Once closed the pressure exerted on them by the column of fluid on the outside of the tubular keeps them closed.

The deepest non-return valve is inside a tubular usually referred to as a float shoe. The float shoe defines the bottom of the tubular and often has a rounded nose profile at its end to act as a guide to help the deployment of the pipe. When running casing, it is also common to have a least a second separate non-return valve above the float shoe, in an upper device referred to as a float collar. The float collar often has a landing surface for a drillable wiper displacement plug to prevent further pumping and displacement of the cement slurry. The float collar usually has an upper and lower threaded connection so that it can be inserted between sections of casing at a pre-determined position above the float shoe.

Float equipment is used in one form or another in various different sizes in nearly all oil or gas wells that are drilled, and in particular when running and cementing casing. It is common for three to five different sets of float sizes to be used in one well (corresponding to different casing diameters), although some wells may use more than eight sets.

It is important to the success of the cementing operation that the non-return valves function correctly. They must open when pumping commences relatively easily and allow significant volumes of drilling mud and liquid cement to pass through them. They must close at the end of the cementing operation and they must withstand significant back pressure. They must often also withstand elevated temperatures found in the rock at significant drilled depths. They must be compatible with various types of chemicals, oils and water found in drilling muds as well as with the liquid cement slurry. They must also tolerate certain amounts of debris, scale, metal filings that can be found in oil and gas wells as a result of drilling operations.

The float collar and its integral drillable landing surface must also be capable of withstanding an applied load as it is common practice to apply a positive pressure on top of a wiper plug to check the pressure integrity of the casing that has been deployed.

The non-return valves are also important for the safety of the well construction process, as they prevent unwanted fluids or gases from entering the casing during installation so that they do not vent out of the top of the casing. If the valves failed to close properly, there would be a risk of uncontrolled volumes of flammable liquid hydrocarbons or gas entering the casing and venting to surface.

To enable drilling to continue beyond the casing depth, the float shoe and float collar must typically remain drillable with commonly used rock drilling tools (although occasionally float equipment may be manufactured from non-drillable materials when it is known that it is the last set of equipment to be deployed in the well and it will not be drilled through).

Examples of traditional float shoes are described in U.S. Pat. No. 1,937,188, U.S. Pat. No. 2,008,818, and U.S. Pat. No. 2,117,318. U.S. Pat. No. 1,937,188 relates to a float shoe which comprises an aluminium body to allow it to be drilled out after the casing has been set. An anchor is provided in the guide shoe to reduce the tendency of the shoe to rotate with the drilling tool when being drilled. The float shoe is joined to a pipe connection by pouring a molten material between respective parts to form a permanent connection, and voids in the show are filled with cement.

A wide range of float equipment is available on the market, and modern designs include advanced functionality and additional features. Modern float equipment often includes non-return valves formed from plastic material, such as a Nylon-based plastic or phenolic resin, aluminium, rubbers, and various combinations of these materials. The hull of the float shoe or float collar is usually a steel material that matches the dimensions and specifications of the casing to which it becomes attached. The steel threaded hull is usually grooved on its inner bore and the valves—which are drillable—are positioned inside. Liquid cement is poured into the hull around the outside of the valve to secure it in the float equipment in a way that ensures that the inlet and outlet of the valve are free of cement. A tubular port extends through the shoe to allow for fluid transfer through the valve. The valves may alternatively be secured and sealed inside the steel hull by a threaded or pinned fixture.

The importance of float equipment to the successful and safe completion of oil and gas wells has led the industry to develop acceptance guidelines for the manufacture and functionality of float equipment. The guidelines include a number of performance acceptance tests that qualify the float equipment as suitable for use in oil and gas wells. These acceptance tests focus mainly on the durability and integrity of the valve. The tests include (a) pumping different fluids at various rates for a range of durations to simulate casing cementing operations and (b) applying heat to the valves. Subsequently pressure tests are applied including a low pressure tests and high pressure tests that simulate the conditions the valves have to endure during and after cementing. The oil and gas industry generally only uses float equipment designs with valves that have passed these qualifications tests, although some unqualified valves may still be used from time to time.

Once a valve type has been qualified this design is manufactured and used in float equipment widely. However, float equipment fails from time to time when it is in the well. These failures may occur for a number of different reasons. Poor quality assurance routines during the manufacture and assembly of the float equipment may cause the equipment to fail, or failure may result from the procedures of the manufacturer not being followed correctly. The float equipment may be subjected to a significant shock load during transportation from the manufacturing plant to the country of use without being reported. The float equipment may also become damaged during the threading procedure after it has been assembled. The drillable non-return valves may fail due to use of faulty materials in the construction of the valve, or the cement slurry used to secure the valve in place may not have been mixed correctly. There are a number of ways in which the valve may fail when under load in the oil or gas well which are not obvious to the human eye when visually inspecting or manually functioning the item.

Some rudimentary checks usually take place at the time of installation into the well. These checks are performed very near the surface of the well before the casing is run any significant distance, and involve lowering the end of the casing string with the float shoe on into the well fluid and seeing if the casing fills with drilling mud. This would indicate that the valve is leaking, so if the casing does not fill above the valve, this check is deemed successful. A similar check involves filling the inside of the casing above the float shoe with drilling mud and then lifting up the shoe out of the top of the well to see if it drains. This would indicate that the valve is opening, so if the mud exits this test is deemed successful. This process is then usually repeated with the float collar is attached to the casing, prior to the rest of the casing being run.

While these checks may identify some serious malfunctions of the valve, they do not properly replicate the conditions to which the equipment will be exposed when in the wellbore. They do not load the valve or the mechanism of its attachment to any significant value and are unlikely to indicate any weaknesses in the equipment. It is only once the equipment has been run to the bottom of the well into the hole drilled in the rock and the cement job performed that it will be loaded towards its design rating.

Unfortunately, a failure that only manifests itself due to loading at the end of the cementing operation is not easily dealt with. The equipment is submerged a significant distance in the well and surrounded by liquid cement that is going to harden in a number of hours. The cement will thicken significantly before it hardens and will prevent further pumping or withdrawal of the casing string. Under these circumstances the only usual remedy is to wait for many hours, with the final circulating pressure held on the casing, until the cement is hard. This is time consuming and costly and, in addition, can lead to technical problems with the well during its lifetime.

It is amongst the aims and objects of the invention to provide a method of testing float equipment (such as float shoes and float collars) which addresses one or more deficiencies of the conventional checks. It is one object of the invention to provide an apparatus and a method which provides for efficient and effective testing of float equipment after manufacture, but prior to use at the oil or gas well site. A further aim of the invention is to provide an apparatus and method for testing float equipment under conditions closer to the conditions experienced in use (and in particular, under the loads experienced during use). It is a further aim of the invention to provide an apparatus and method which is flexible enough to be used with a wide range of float equipment designs and sizes.

Further aims and objects of the invention will become apparent from the following description.

BRIEF SUMMARY OF THE INVENTION

In the context of the specification, the term "float equipment" should be construed broadly to relate to float shoes and float collars of varying types (including coupling connection outer diameter, flush joint connection outer diameter, and flush welded connection diameter); conventional float equipment including valves, manual and auto-fill float equipment, reamer shoes, ribbed or stabilised shoes, and other equipment which functions as a back pressure device in cementing or tubular running applications.

According to a first aspect of the invention, there is provided an apparatus for testing float equipment used in the construction of wellbores for the hydrocarbon exploration and production industry, the apparatus comprising:

a housing and an opening for receiving at least a part of an item of float equipment;

a seal arrangement configured to seal with the item of float equipment, such that the housing and seal arrangement together define a test chamber; and means for pressurising the test chamber to thereby expose at least a part of the item of float equipment in the test chamber to a test pressure.

The invention provides a convenient apparatus for performing tests on float equipment with greater efficiency and ease of use. The apparatus allows testing of the float equipment under conditions resembling those experienced in a wellbore completion.

Preferably, the seal arrangement is configured to seal around the item of float equipment, and most preferably around an outside surface. The seal arrangement may comprise a compression seal, which may be energised by an actuator. The actuator may be a mechanical actuator or may be compressed by threading a setting collar on the apparatus. Alternatively or in addition, the sealing arrangement may be compressed by rotating one or more axial bolts or screws to cause a setting collar to slide in an axial direction.

Alternatively, the actuator may be a hydraulic actuator.

Seal arrangements which are energised by mechanical and/or hydraulic actuators are preferred as they allow sealing against a wider range of diameters of float equipment and/or more effective seals against equipment with surface defects or non-circular cross-sections. Preferably the seal may be actuated or energised from a first condition, in which it has a first inner diameter, to a second condition, in which it has a second inner diameter less than the first inner diameter.

In an alternative embodiments of the invention, the seal arrangement is configured to seal around an inside surface or end surface of the item of float equipment. This may be advantageous for example where the outside of the float equipment has an irregular or profiled outer surface against which it is difficult to provide a seal.

Embodiments of the invention therefore provide a seal around an item of float equipment, without requiring specific fittings or shapes on the float equipment itself. In particular, the invention does not rely on engagement with threads on the float equipment to provide a seal. Use of non-threaded attachment and sealing provides ease of operation and flexibility of application to a wide range of float equipment. This is particularly significant for testing float shoes, which are unlikely in their fully manufactured or assembled state to have threads at their lower (distal) ends on which the guide shoe portions are located. It also allows testing of float equipment which is unthreaded or blank (i.e. before a thread has been formed on the equipment).

The apparatus may comprise one open end. The seal arrangement may be disposed around the opening to the one open end. The apparatus may therefore be used with a wide range of lengths of equipment without difficulty. In particular this permits float shoes and/or float collars to be tested while coupled to an adjacent casing joint.

The housing may comprise first and second open ends, and may comprise a removable end cap. The removable end cap may comprise a threaded engagement with the housing.

The apparatus may comprise a main housing portion and an extended housing portion, which may be configured to be coupled to the main housing portion to increase the length of a chamber defined by the apparatus. In such an embodiment, the chamber may be defined by the housing and the extended housing portion together. The extended housing portion may be configured to receive a removable end cap.

The apparatus may comprise a modular kit of components, including a housing and at least one extended housing portion, where the at least one extended housing portion may be assembled with the housing to form testing apparatus of a range of lengths.

Preferably, the apparatus is sized and shaped to provide a clearance fit to an item of float equipment to be tested. The apparatus may be sized and shaped such that when the seal is made with an item of float equipment being tested, there is an annular space between an inner wall of the housing and an outer wall of the float equipment.

Alternative embodiments of the invention may be configured for threaded coupling with an item of float equipment to be tested. A threaded coupling may be used as an alternative to or in conjunction with a seal on the outer surface or inner surface of the float equipment. However, it is an advantage of preferred embodiments of the invention that they are not threaded to the item of float equipment. Such embodiments have the advantage that they do not require modification or special manufacturing of the float equipment. Forming a thread in the float equipment may impinge on a box coupling on the float equipment which is designed to couple the equipment into a tubular. It may also (e.g. in the case of flush joint float equipment) require the undesirable removal of material from the casing outer diameter. Non-threaded seals (e.g. mechanically actuated or energised seal rings) as used in preferred embodiments do not suffer from these disadvantages.

The apparatus may be sized and shaped such that when an item of float equipment is received in the housing, the axial distance between the opening and a valve in the equipment is greater than the axial distance between the opening and the seal arrangement. This ensures that the valve is located at a position which is "lower" in the apparatus than the seal arrangement, and conversely that the test chamber extends axially beyond the position of the valve. In other words, the valve may be located in a volume defined by the housing and the seal arrangement. This is advantageous, as it allows pressure to be built up on the outside of the float equipment and the inside of the float equipment. This simultaneous loading of the inside of the float equipment and the outside of the float equipment more precisely reflects the load conditions experienced in the well.

The apparatus may comprise a pressure inlet, and may comprise a pressure release device, which may be a rupture disc configured to release pressure from the test chamber on exposure to pressure exceeding a preset threshold.

The apparatus may comprise an attachment and retaining mechanism, which may comprise a setting collar. The setting collar may provide an abutment surface for the sealing arrangement. The setting collar may be rotatable on the apparatus, and may be threaded with the housing. Alternatively or in addition, the setting collar may be moved by means of one or more axially threaded bolts or screws.

The attachment and retaining mechanism may comprise at least one shoulder for retaining the item of float equipment with the apparatus. The shoulder may be configured to abut an end of an item of float equipment, and/or may be configured to abut a raised outer profile (such as a profile of a joint). Alternatively, or in addition, the attachment and retaining mechanism may comprise at least one slip mechanism for retaining the item of float equipment with the apparatus.

According to a second aspect of the invention, there is provided a method for testing float equipment used in the construction of wellbores for the hydrocarbon exploration and production industry, the method comprising:

providing a testing apparatus including a housing;

locating at least a part of an item of float equipment in the housing;

sealing against the item of float equipment such that at least a part of the float equipment is located in a test chamber defined by the housing and the seal arrangement;

pressurising the test chamber to expose the float equipment to a test pressure.

providing a testing apparatus including a housing;

locating at least a part of an item of float equipment in the housing;

sealing against the item of float equipment such that at least a part of the float equipment is located in a test chamber defined by the housing and the seal arrangement;

pressurising the test chamber to expose the float equipment to a test pressure.

The method may comprise locating the float equipment in the housing with a clearance fit. The method may comprise exposing the float equipment to a test pressure on the inside of the float equipment and the outside of the float equipment. Preferably, the method comprises exposing the float equipment to a test pressure on the inside and outside of the float equipment at the axial location of a valve in the float equipment.

The method may comprise activating a compression seal to seal the item of float equipment against the apparatus. The compression seal may be activated by axially compressing a seal element by axial movement of a ring or collar. The ring may be moved by threading with the housing. Alternatively or in addition, the ring may be moved by rotation of one or more axial bolts or screws.

The method may comprise assembling an attachment and retaining mechanism on the apparatus to retain the item of float equipment with the apparatus.

The method may comprise raising the pressure in the test chamber to around 10,000 psi (about 69 MPa) to 15,000 psi (about 103 MPa). The method may comprise adjusting the temperature of the apparatus.

Embodiments of the second aspect of the invention may include one or more features of the first aspect of the invention or its embodiments, or vice versa.

According to a third aspect of the invention, there is provided an apparatus for testing float equipment used in the construction of wellbores for the hydrocarbon exploration and production industry, the apparatus comprising:

a housing and an opening for receiving at least a part of an item of float equipment, the housing defining a test chamber of the apparatus;

means for pressurising the test chamber to load at least a part of an outside surface of the item of float equipment and at least a part of the inside surface of the item of float equipment.

Embodiments of the third aspect of the invention may include one or more features of the first or second aspects of the invention or its embodiments, or vice versa.

According to a fourth aspect of the invention, there is provided a method for testing float equipment used in the construction of wellbores for the hydrocarbon exploration and production industry, the method comprising:

providing an testing apparatus including a housing;

locating at least a part of an item of float equipment in the housing;

pressurising the test chamber to expose the float equipment to load at least a part of an outside surface of the item of float equipment and at least a part of the inside surface of the item of float equipment.

Embodiments of the fourth aspect of the invention may include one or more features of the first to third aspects of the invention or its embodiments, or vice versa.

BRIEF DESCRIPTION OF THE DRAWINGS

There will now be described, by way of example only, various embodiments of the invention with reference to the drawings, of which.

DETAILED DESCRIPTION OF THE PREFERRED EMBODIMENTS

Figure 1:
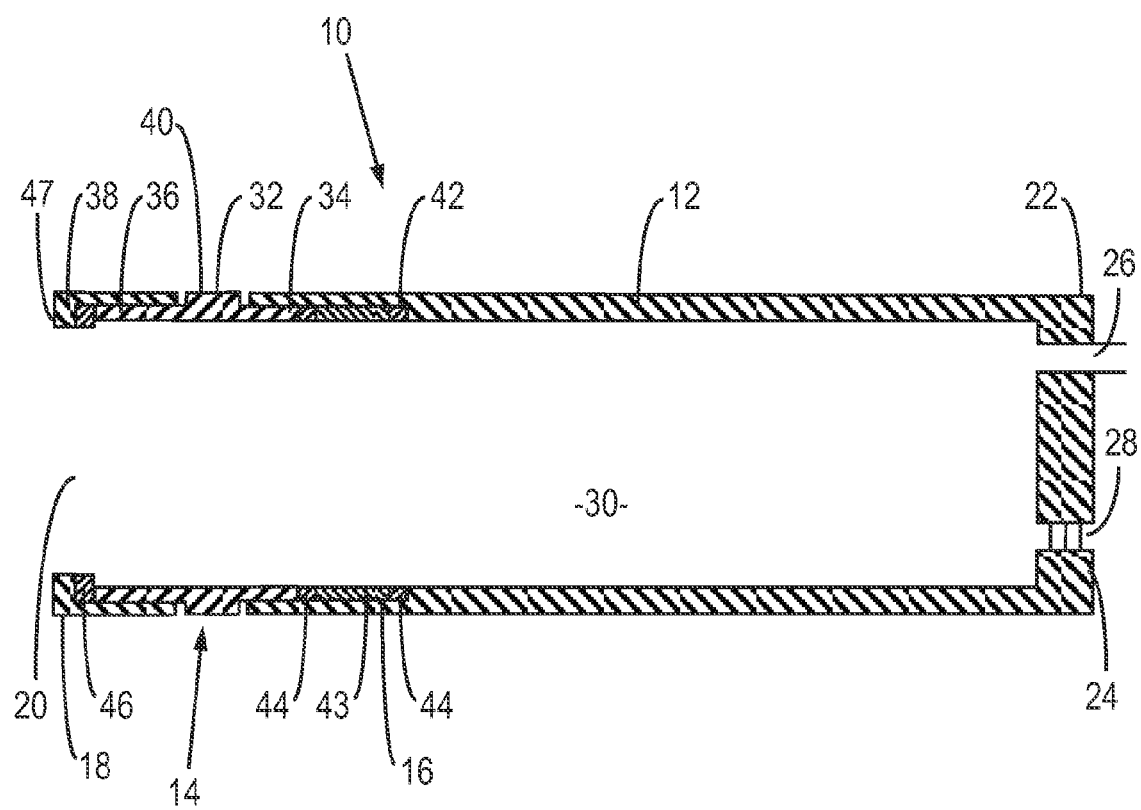
FIG. 1 is a schematic representation of an apparatus in accordance with a first embodiment of the invention in longitudinal section.

Referring firstly to FIG. 1, there is shown generally at 10 an apparatus for testing an item of float equipment, including but not limited to float shoes and float collars. The apparatus 10 comprises a housing 12 (which in this example is substantially cylindrical), an attachment and retaining mechanism generally shown at 14, and a sealing arrangement 16. At a first end 18, the apparatus 10 comprises an opening 20 which permits the passage of a part of an item of float equipment (not shown) into the housing. At a second end 22, the apparatus 10 comprises a plate 24 with pressure control devices 26 and 28 (the operation of which will be described below). The housing 12 therefore defines a substantially cylindrical internal volume, open at one end 10 and bound by an opposing end 22. The housing 12 is formed to an inner diameter which can accommodate the largest size of float equipment to be tested.

The attachment and retaining mechanism 14 is located at the first end 18 of the apparatus, and around the opening 20. In this embodiment, the mechanism comprises a setting collar 32 which has a throughbore corresponding to the inner diameter of the housing. The setting collar 32 has a threaded profile 34 for engaging with a corresponding profile on the housing 12. A second threaded profile 36 attaches to a corresponding threaded profile of a retaining ring 38. A raised outer diameter portion 40 assists manual rotation of the setting collar 32 with respect to the housing 12 for connection and disconnection.

The sealing arrangement 16 is disposed in a recess of the housing between the setting collar 32 and a shoulder 42. The sealing arrangement 16 includes a compressible elastomeric seal 43 and a pair of back up rings 44. A shoulder 45 of the setting collar abuts the sealing arrangement 16, such that axial displacement of the setting collar with respect to the housing (by threading) will compress the elastomeric seal 43 and displace it radially inwards.

The retaining ring 38 is threaded over the setting collar 32 and includes a retaining flange 46 which extends radially inwards, and is located between a retaining shoulder 47 of the retaining ring 38 and the setting collar 32.

Figure 2A:
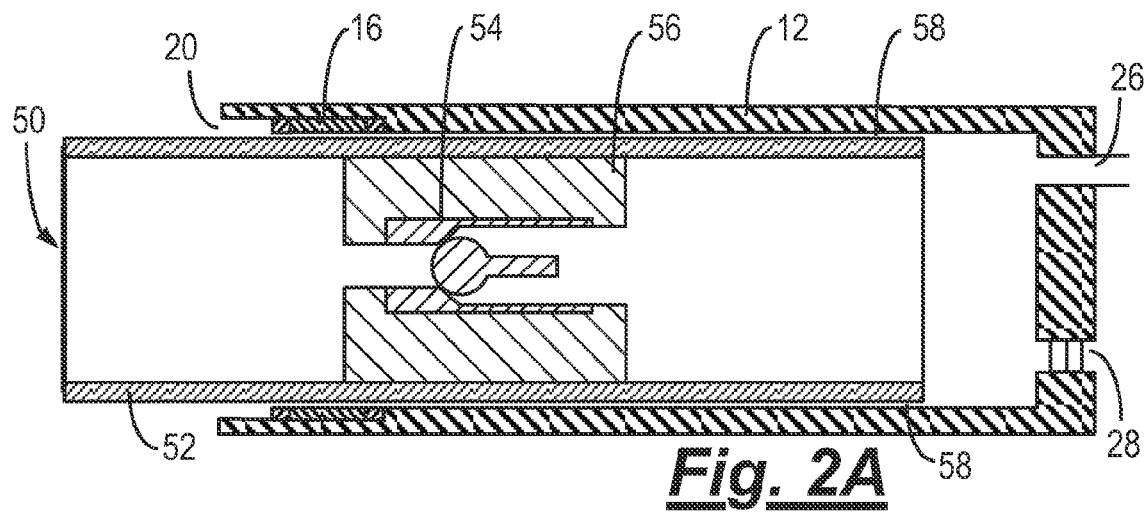
FIGS. 2A to 2C are schematic representations of the apparatus of FIG. 1 being used to perform a test on a float collar at various stages of assembly and testing.
Figure 2B:
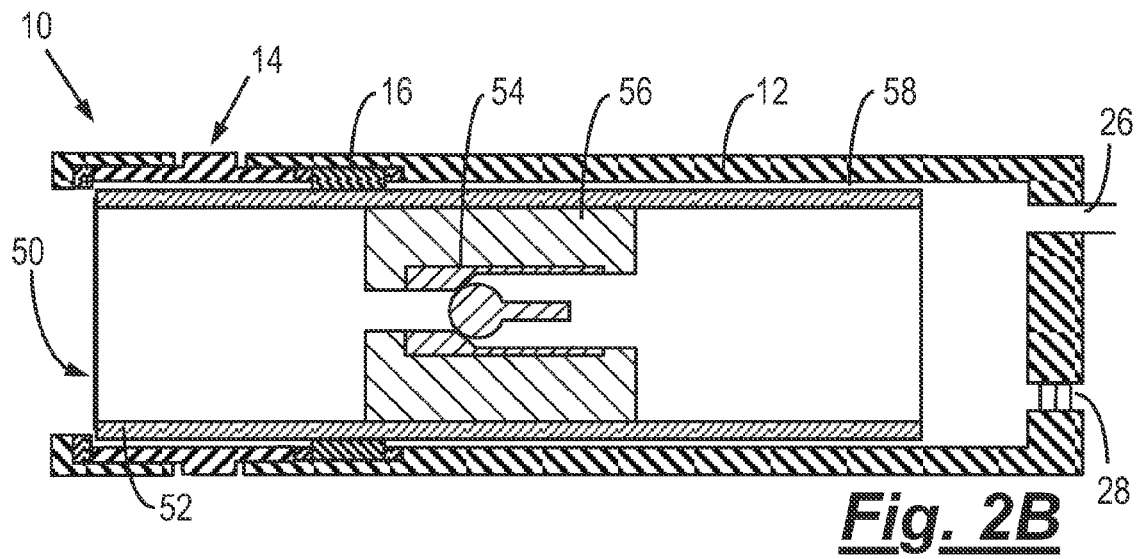
Figure 2C:
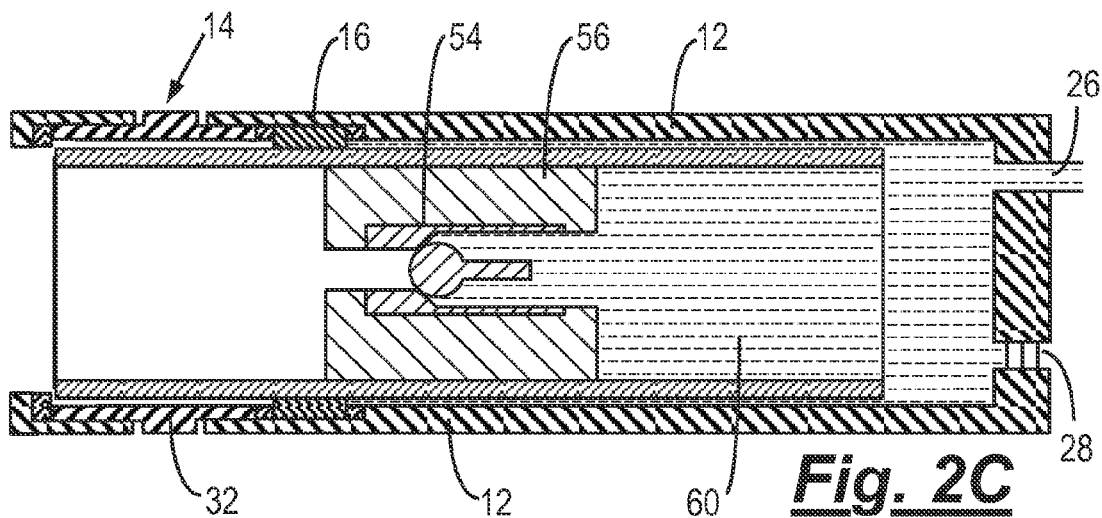

FIGS. 2A to 2C show the apparatus of FIG. 1 in use in the testing of a float collar 50. The float collar 50 comprises a hull 52, and a valve 54 secured into the hull 52 by a cement volume 56. The collar 52 has a throughbore open at both ends and has threaded connections (not shown) for coupling the float collar 52 to threaded ends of casing joints when assembled in the casing string.

A shown in FIG. 2A, the float collar 52 is passed through the opening 20 with the attachment and retaining mechanism 14 removed, such that a lower portion ("lower" in the direction of the casing string in which it will be assembled) of the float collar is within the housing 12. The float collar 52 has a clearance fit with the inner diameter of the housing, and there is an annular space 58 between the outer surface of the float collar and the inner surface of the housing 12. The float collar 52 extends into the apparatus to a position at which the valve 54 has passed the sealing arrangement 16.

When the float collar 52 is in position, the setting collar 32 and the retaining ring are assembled, and the setting collar is threaded to compress the elastomeric seal 43 into sealing engagement with the outer surface of the float collar 52, as shown in FIG. 2B. In this position, the retaining flange 46 and retaining ring 38 is made up to the upper end of the float collar to provide an abutment surface, locking it in the apparatus and preventing the collar from passing out of the apparatus 10. This means that the retaining flange 46 and retaining ring 38 are taking the load from the fluid pressure to preventing the float equipment from being pumped out of the apparatus. The seal and housing together define a test chamber for a pressure test of the float equipment.

FIG. 2C shows a pressure test step of the testing method. A high pressure pump (not shown) is attached to the fluid inlet 26, fluid 60 is delivered to pressurise the test chamber. High pressure of up to 10,000 psi (about 69 MPa) to 15,000 psi (about 103 MPa) can be generated in the test chamber, and the pressure (and load) is applied to the float collar on the inside of the collar below the valve and the outside of the collar in the annular space 58 up to the elastomeric seal 43. This is above the axial position of the valve, and therefore the float collar 50 experiences the load on the inside and the outside of the collar at the position of the valve, which is a more realistic approximation of wellbore conditions. The pressure test is applied for the required duration and over cycles which approximate conditions experienced during cementing operations. Temperature variations are optionally applied to the valve by changing the temperature of the fluid or by heating the apparatus direct. During the pressure test the integrity of the valve 56 and its attachment into the hull 52 can therefore be tested under loaded conditions. The rupture disc 28 provides a safety mechanism; in the event of excessive pressure being built up in the test chamber the disc will rupture to release the pressure.

Figure 3:
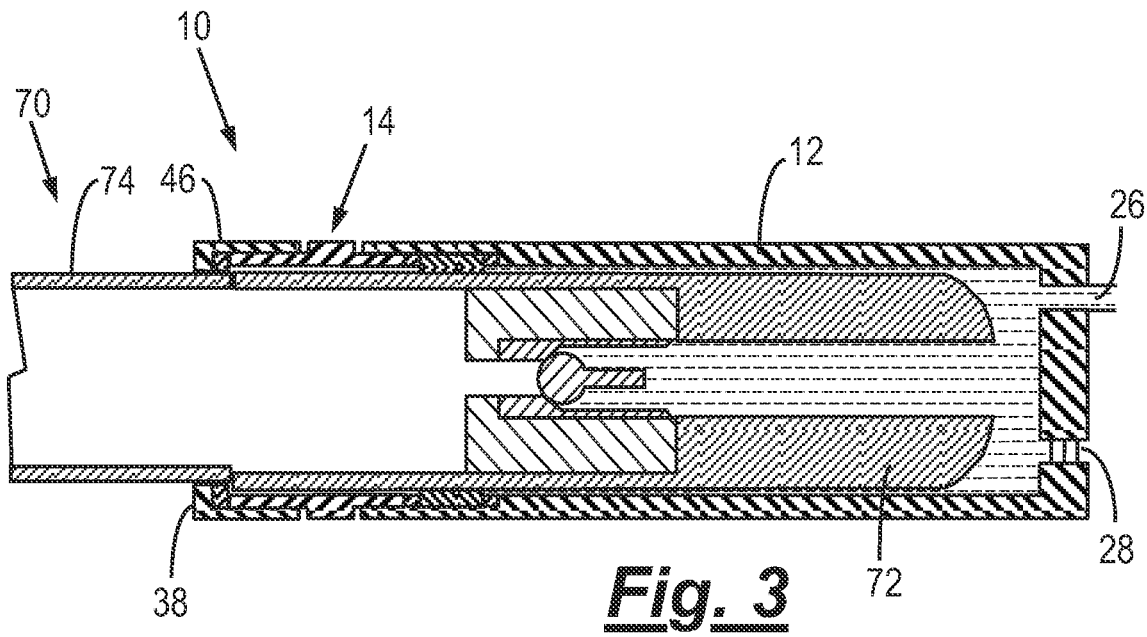
FIG. 3 is a schematic representation of the apparatus of FIG. 1 being used to test a float shoe assembled onto a casing joint.

FIG. 3 is a longitudinal section of the apparatus 10 used in the testing of a float shoe assembly 70 comprising a float shoe 72 attached to a casing joint 74. The method is similar to the method described with reference to FIGS. 2A to 2C, and will be understood from the accompanying text. In this embodiment the float shoe 72 is assembled with a casing joint 74 to provide a continuous tubular without an end which can be fully accommodated in the retaining mechanism 14. However, the coupling between the casing joint 74 and the float shoe 72 has a sufficiently upset outer profile to abut the retaining flange 46 to allow it to be axially keyed and prevented from being pumped out of the apparatus 10 under pressure during testing.

Figure 4:
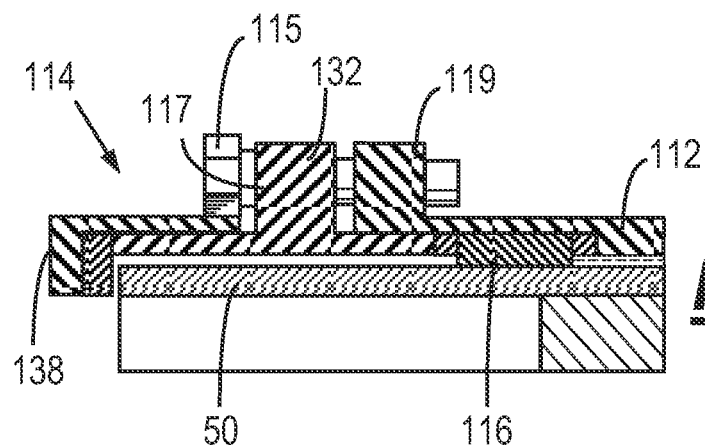
FIG. 4 is a detail of an apparatus according to a second aspect of the invention having an alternative attachment and seal energising mechanism.

FIG. 4 shows schematically details of a retaining and attachment mechanism, generally shown at 114, of an alternative embodiment of the invention. This variation comprises a sliding setting collar 132 which is moved axially on the apparatus by tightening an axial bolt 115 which extends through raised portions 117, 119 on the setting collar and housing respectively. In this embodiment, it is not necessary to rotate the entire setting collar 132 manually; instead individual bolts arranged around the circumference of the apparatus can be adjusted separately to compress or decompress the seal arrangement 116. This embodiment is particularly suited to a large diameter apparatus in which it would be difficult to rotate the setting collar to compress the seal.

Figure 5:
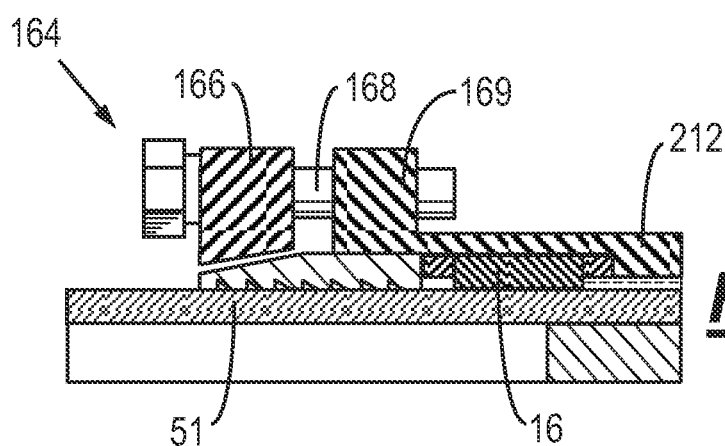
FIG. 5 is a detail of an apparatus according to a third aspect of the invention having a further alternative embodiment of the invention attachment and seal energising mechanism.

FIG. 5 shows schematically details of a retaining and attachment mechanism, generally shown at 164, of an alternative embodiment of the invention. The variation is configured for use with items of float equipment 51 which have flush outer diameters, which therefore have no upset outer profile for engagement with a retaining shoulder. In this configuration, the mechanism 164 omits the setting collar of the mechanisms 14 and 114, and instead comprises an annular ring 166 which is axially movable with respect to the housing 162 by tightening a threaded bolt 168 which couples the ring to a raised portion 169 of the housing. The inside surface of the ring 166 has a conical profile which corresponds with the outer profile of one or more slips 170, which have engaging teeth on their inner surfaces. Axial movement of the ring 166 causes a corresponding inward radial movement of the slips 170 to engage and lock with the outer surface of the float equipment, retaining it in the apparatus.

Figure 6:
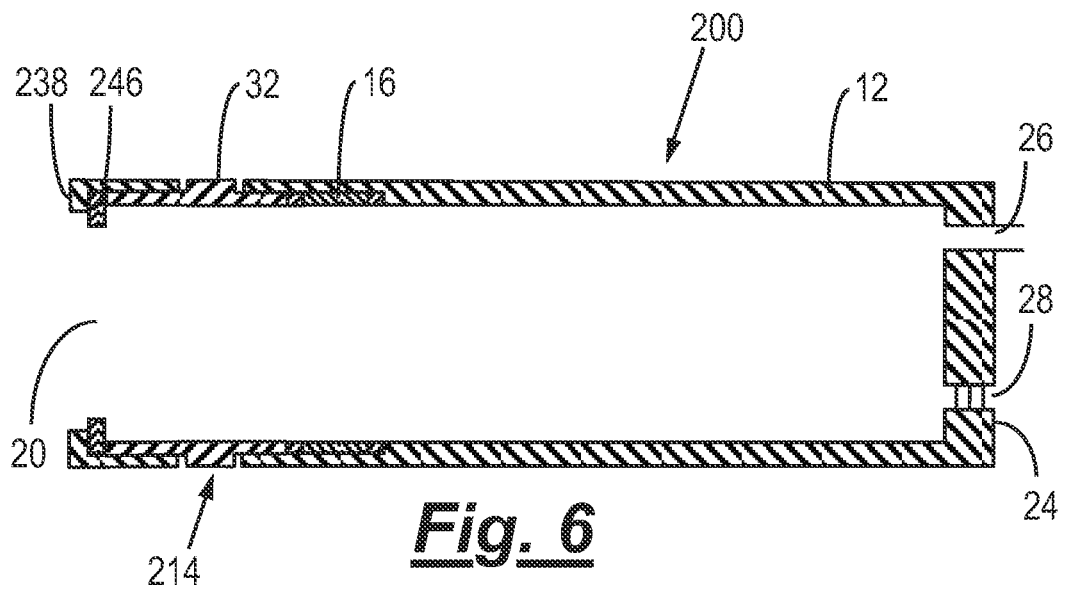
FIG. 6 is a schematic representation of an apparatus in accordance with an alternative embodiment including an extended retaining flange.

FIG. 6 shows schematically an apparatus 200 according to an alternative embodiment of the invention. The apparatus 200 is similar to the apparatus 10 and will be understood from FIG. 1 and the associated description (like parts are indicated by like reference numerals). However, the apparatus 200 differs from the apparatus of FIGS. 1 to 5 in that the retaining flange 246 extends further radially inwards to provide a larger abutment surface for an end of the float equipment.

Figure 7:
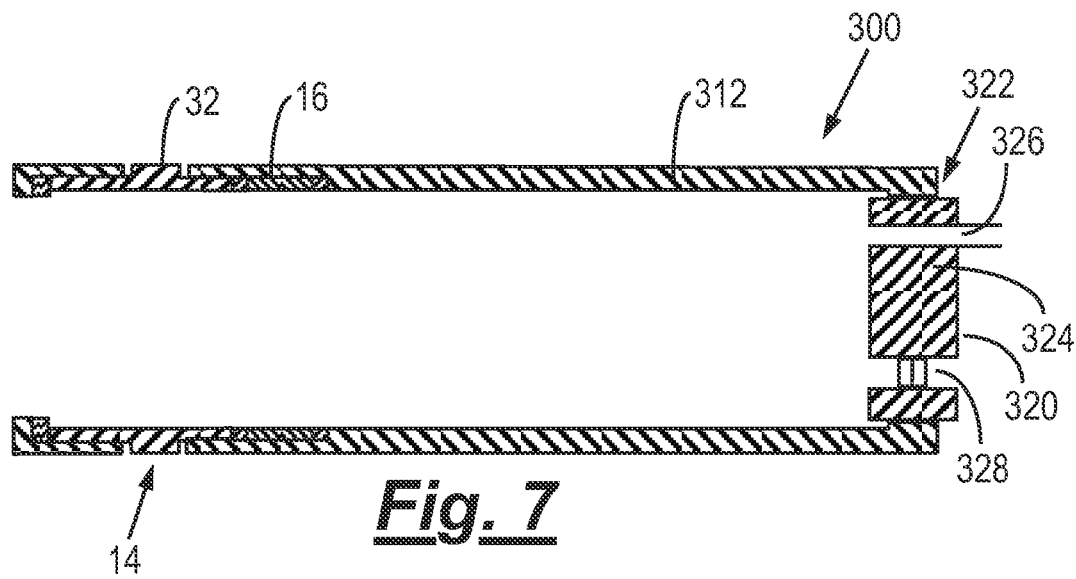
FIG. 7 is a schematic representation of an apparatus in accordance with an alternative embodiment including a removable end cap.

A further alternative embodiment of the invention is shown schematically in FIG. 7. In this embodiment, the apparatus, shown generally at 300, is similar to the apparatus 10 of the first embodiment of the invention, and will be understood from FIGS. 1 to 3 and the accompanying text. Like components are indicated with like reference numerals. The apparatus 300 differs from previous embodiments in that the housing 312 has an opening 320 at the end 322 which opposes the end at which the seal arrangement 16 is located. This is in contrast the apparatus 10, which has a housing with an integral or unitary formed end plate. The end 322 accommodates a removable end cap 324. The end cap 324 is joined to the housing 312 by threaded engagement, and is provided with pressure control devices in the form of fluid inlet 326 and rupture disc 328. Benefits of the embodiment of FIG. 7 include ease of manufacture and assembly, and improved access to the chamber defined by the housing 312. The removable end cap also permits the flexible application to a wider range of float equipment sizes, and in particular to sizes which are too long to be accommodated in the main housing.

Figure 8:
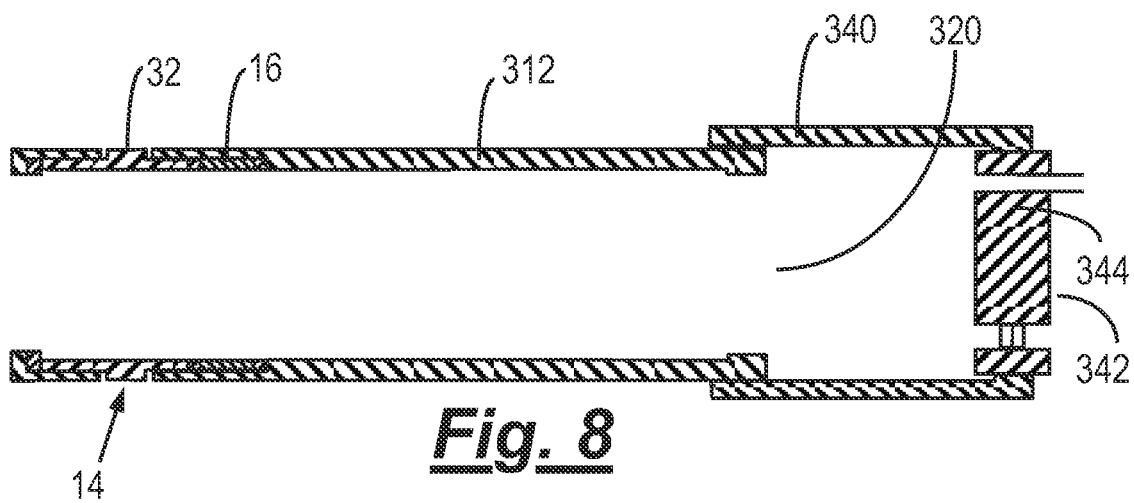
FIG. 8 is a schematic representation of an apparatus in accordance with an alternative embodiment including an extended body.
Figure 3:
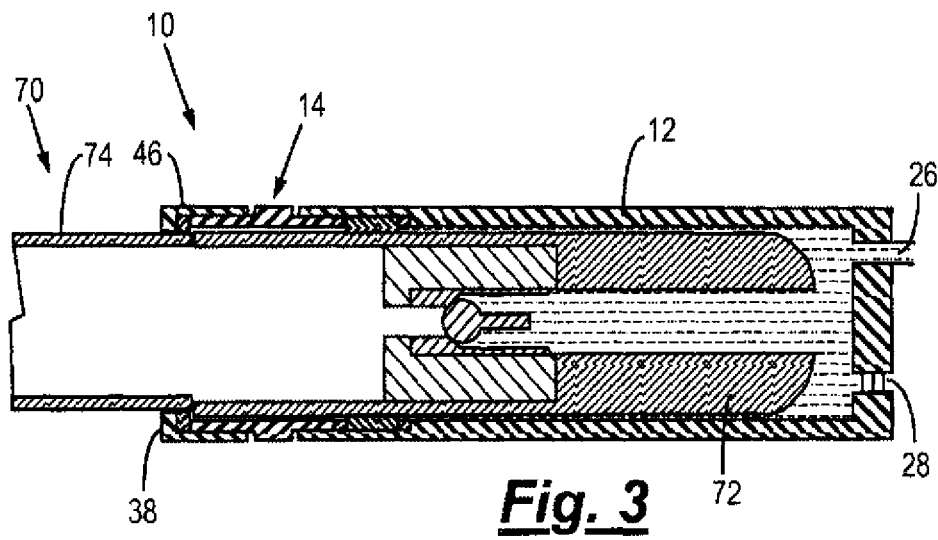
Figure 4:
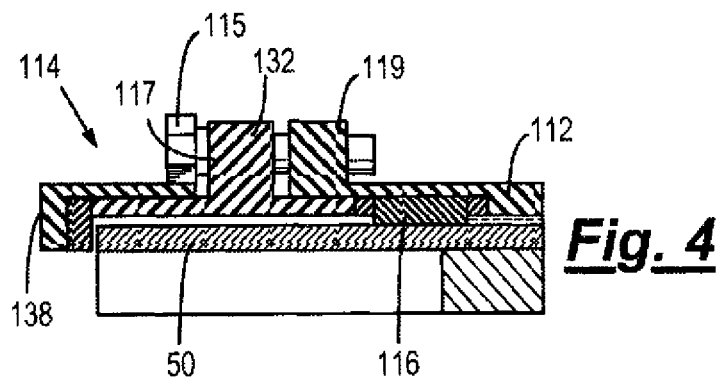
Figure 5:
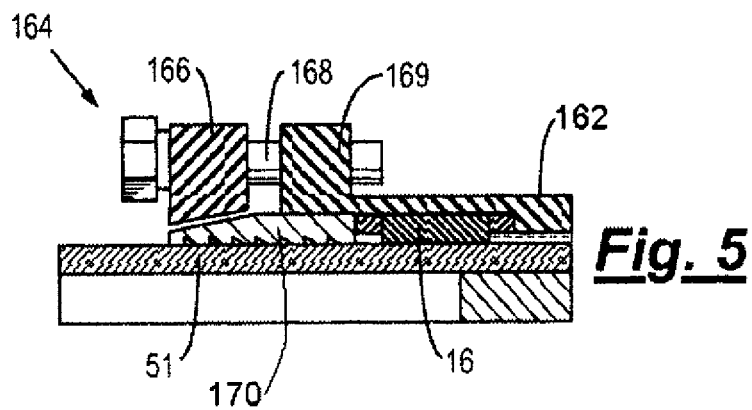

FIG. 8 shows schematically an example of the apparatus 300 used in conjunction with a housing extension portion 340. The housing extension portion 340 is a substantially cylindrical tube which fits over the end 22 of the housing 312 and is secured thereto by threaded engagements. The extended housing portion increases the size of the chamber and allows items of float equipment of increased length to be accommodated and tested. The opposing end of the extended housing portion 340 comprises an opening 342 designed to receive an end cap 344, with pressure control equipment as described above.

This configuration has particular application to testing long items of float equipment. For example, in the oil and gas industry it is common for a float collar to be assembled with a pup joint to facilitate handling. This increases the overall length of the assembled item, and it is convenient to be able to test the equipment in its assembled form. This would require a longer testing apparatus, which would obviously have a greater volume of materials, higher weight and a larger footprint, and therefore would require greater capital and operational expense. On the other hand, a large test apparatus would not be required for testing a high proportion of float equipment such as float collars and float shoes. The embodiment of FIG. 8 is advantageous as it can be configured for use with standard length items or reconfigured for use with longer items such as an assembly of a float collar and a pup joint. The embodiment can be provided as a modular kit of components which can be assembled to form a testing apparatus of the necessary length. This can be achieved without constant use of a single housing of large size and length to accommodate all test items, and without requiring several complete test apparatus at different sizes at a testing facility.

It will be appreciated that the extended housing portion may be of different lengths, or indeed more than one extended housing portion may be used together to assemble a testing apparatus of even greater length.

Variations to the described embodiments are within the scope of the invention. In particular, dimensions and sizes may be varied within the scope of invention to accommodate a range of float equipment sizes and types. Certain components of the apparatus (such as the seal and the retaining rings) may be removed and replaced with smaller inner diameter pieces to better accommodate smaller items of float equipment, or specialist shoes such as those with bulbous ends. The invention may be used with float equipment which contains multiple valves (although it may be desirable to disable one of the valves while the other is being tested).

The invention provides an apparatus and method for testing float equipment used in the construction of wellbores for the hydrocarbon exploration and production industry. The apparatus has a housing and an opening for receiving an item of float equipment. A seal arrangement is configured to seal with the item of float equipment, such that the housing and seal arrangement together define a test chamber. The test chamber is pressurised to expose at least a part of the item of float equipment in the test chamber to a test pressure. In embodiments of the invention, at least a part of an outside surface and at least a part of the item of float equipment may be simultaneously loaded. The tests performed more closely simulate the conditions to which the equipment is exposed in a wellbore.

The invention provides a method of testing float equipment (such as float shoes and float collars) which addresses one or more deficiencies of the conventional checks. It provides for efficient and effective testing of float equipment after manufacture, but prior to use at the oil or gas well site. The invention also provides an apparatus and method which is flexible enough to be used with a wide range of float equipment designs and sizes. Embodiments of the invention are able to provide a seal around an item of float equipment, without requiring specific fittings, shapes or threads on the float equipment itself. Use of non-threaded attachment and sealing provides ease of operation and flexibility of application to a wide range of float equipment, and is particularly useful for testing float shoes, which are unlikely in their fully manufactured state to have threads at their lower (distal) ends. It also allows testing of float equipment which is unthreaded or blank (i.e. before a thread has been formed on the equipment).

Various modifications may be made within the scope of the invention as herein intended, and embodiments of the invention may include combinations of features other than those expressly claimed herein.

What is claimed is:

1. An apparatus for testing float equipment used in the construction of wellbores for the hydrocarbon exploration and production industry, the apparatus comprising:
   a housing and an opening for receiving at least a part of an item of float equipment;
   a seal arrangement configured to seal with the item of float equipment, such that the housing and seal arrangement together define a test chamber; and
   means for pressurising the test chamber to thereby expose at least a part of the item of float equipment in the test chamber to a test pressure.

2. The apparatus according to claim 1 comprising a main housing portion and an extended housing portion configured to be coupled to the main housing portion to increase the length of a chamber defined by the apparatus.

3. The apparatus according to claim 1, wherein the apparatus is sized and shaped to provide a clearance fit to an item of float equipment to be tested.

4. The apparatus according to claim 1, wherein the apparatus is sized and shaped such that when the seal is made with an item of float equipment being tested, there is an annular space between an inner wall of the housing and an outer wall of the float equipment.

5. The apparatus according to claim 1, wherein the apparatus is sized and shaped such that when an item of float equipment is received in the housing, the axial distance between the opening and a valve in the equipment is greater than the axial distance between the opening and the seal arrangement.

6. The apparatus according to claim 1 comprising an attachment and retaining mechanism for retaining an item of float equipment.

7. The apparatus according to claim 6, wherein the attachment and retaining mechanism provides an abutment surface for the sealing arrangement.

8. The apparatus according to claim 6, wherein the attachment and retaining mechanism comprises a setting collar.

9. The apparatus according to claim 6, wherein the attachment and retaining mechanism comprises at least one slip mechanism for retaining the item of float equipment with the apparatus.

10. The apparatus according to claim 6, configured to seal with an item of float equipment at an unthreaded or blank surface of the item of float equipment.

11. The apparatus according to claim 1, wherein the seal arrangement comprises a compression seal, which is operable to be energised by an actuator.

12. The apparatus according to claim 11, wherein the actuator comprises a setting collar.

13. The apparatus according to claim 12, wherein the seal arrangement is energised by rotating one or more axial bolts or screws to cause the setting collar to slide in an axial direction.

14. The apparatus according to claim 1 comprising one open end around which the seal arrangement is disposed.

15. The apparatus according to claim 14, wherein the housing comprises first and second open ends, and further comprises a removable end cap.

16. A method for testing float equipment used in the construction of wellbores for the hydrocarbon exploration and production industry, the method comprising:
    providing a testing apparatus including a housing;
    locating at least a part of an item of float equipment in the housing;
    sealing against the item of float equipment such that at least a part of the float equipment is located in a test chamber defined by the housing and the seal arrangement;
    pressurising the test chamber to expose the float equipment to a test pressure.

17. The method according to claim 16 comprising locating the float equipment in the housing with a clearance fit.

18. The method according to claim 16 comprising exposing the float equipment to a test pressure on the inside of the float equipment and the outside of the float equipment.

19. The method according to claim 16 comprising exposing the float equipment to a test pressure on the inside and outside of the float equipment at the axial location of a valve in the float equipment.

20. The method according to claim 16 comprising energising a seal to seal the item of float equipment against the apparatus by operation of a seal actuation mechanism.

21. The method according to claim 16, comprising sealing against the item of float equipment at an unthreaded or blank surface of the item of float equipment.

22. An apparatus for testing float equipment used in the construction of wellbores for the hydrocarbon exploration and production industry, the apparatus comprising:
    a housing and an opening for receiving at least a part of an item of float equipment, the housing defining a test chamber of the apparatus;
    means for pressurising the test chamber to load at least a part of an outside surface of the item of float equipment and at least a part of the inside surface of the item of float equipment.

23. The apparatus according to claim 22, comprising a seal arrangement configured to seal with the item of float equipment, wherein the seal arrangement comprises a compression seal which is operable to be energised by an actuator.

24. The apparatus according to claim 22, comprising a seal arrangement configured to seal with the item of float equipment, wherein the seal arrangement is configured to seal with an item of float equipment at an unthreaded or blank surface of the item of float equipment.

25. A method for testing float equipment used in the construction of wellbores for the hydrocarbon exploration and production industry, the method comprising:
    providing a testing apparatus including a housing;
    locating at least a part of an item of float equipment in the housing;
    pressurising the test chamber to expose the float equipment to load at least a part of an outside surface of the item of float equipment and at least a part of the inside surface of the item of float equipment.

26. The method according to claim 25 comprising energising a seal to seal the item of float equipment against the apparatus by operation of a seal actuation mechanism.

27. The method according to claim 25, comprising sealing against the item of float equipment at an unthreaded or blank surface of the item of float equipment.

* * * * *

UNITED STATES PATENT AND TRADEMARK OFFICE
CERTIFICATE OF CORRECTION

| | | |
|---|---|---|
| PATENT NO. | : 8,661,877 B2 | Page 1 of 2 |
| APPLICATION NO. | : 13/468960 | |
| DATED | : March 4, 2014 | |
| INVENTOR(S) | : Howlett et al. | |

It is certified that error appears in the above-identified patent and that said Letters Patent is hereby corrected as shown below:

In the Drawings

The drawing sheet, consisting of Fig. 5, should be deleted to be replaced with the drawing sheet, consisting of Fig. 5, as shown on the attached page.

In the Specification

Column 1
Line 10, change "herein by reference" to -- herein by reference. --

Column 2
Line 26, change "the show" to -- the shoe --

Column 6
Line 17, change "test pressure." to -- test pressure; --

Column 8
Line 19, change "52" to -- 50 --
Line 21, change "52" to -- 50 --
Line 23, change "52" to -- 50 --
Line 27, change "52" to -- 50 --
Line 31, change "52" to -- 50 --
Line 33, change "52" to -- 50 --
Line 36, change "52" to -- 50 --
Line 42, change "from the fluid pressure to preventing" to -- from the fluid pressure to prevent --
Line 64, change "56" to -- 54 --

Signed and Sealed this
Fifth Day of May, 2015

Michelle K. Lee
*Director of the United States Patent and Trademark Office*